UNITED STATES PATENT OFFICE
PTO – BOYERS, PA DUTY STATION

---

PAGE NOT AVAILABLE

PATENT NUMBER X9513 FOR THE ISSUE DATE 3/18/1836 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

X9513 3-18-1836

George Page of Keene New Hampshire
Letters Patent (Patented March 18. 1836)

The schedule referred to in these Letters Patent and making part of
the same containing a description in the words of the said George Page
himself of his improvement in the machine for mortising small timber;

To all persons to whom these presents shall come, Be it known
that I George Page of Keene in the County of Cheshire and State
of New Hampshire, have invented a new and useful improvement
in the method of mortising by a machine; which machine is descri-
bed as follows. The bottom consists of two pieces of sill work four
inches wide: three inches thick, one piece three feet long. the other piece
three feet and four inches, these are locked together crossing each
other at right angles. the plan of intersection in the shortest piece
being at equal distances from each end and in the longest piece about
two feet from one end the short end being at the front of the
machine. At the place of intersection a mortise is made into
which by a tenon is fixed an upright post four inches square
and seven feet high from the bottom of the sills. Beginning at
three inches from the top of the sills a mortise is made in the di-
rection of the longest sill through this post one inch wide and eleven
inches long. Into the end of the long sill behind the post is fixed by
a mortise an tenon an upright post four inches wide two inches
thick and seventeen inches high from the bottom of the sill. On the
top of this post one end of a lever is inserted a pivot passing thro'
the post and end of the lever; which lever passes thro' the mor-
tise in the ~~end of the~~ post and has upon the other end a piece of
board upon which to place the foot, six inches above the mortise
in the post another mortise is made thro it in the same direction
seven eighths of an inch wide and fifteen inches long. thro' this
mortise pass two moveable iron bolts with a screw collar and nut
on one end of each; one of these bolts passes thro' a piece of tim-
ber called a Rest and has a head on that end. Thro' the other

342. X9513 3-18-1836 end of the other bolt a hole is made thro' which passes an iron in
the shape of a segment of a circle each end of which is attach-
ed to the lower side of the rest. This rest is from two to two &
a half feet long, & four inches ~~long~~ square. By means of the two bolts
screws &c The rest may be made fast and steady at any de-
sired height or inclination. A board three inches and a half
wide is let into the post, even with the face of it and crossing it
the upper edge being two inches above the top of the mortise the
board being cut away against the mortise. Near the top of the
board a cleet or piece of iron is screwed firmly to the post to
prevent the timber from swinging by the operation of the machine;
About four feet three inches from the bottom of the sills a brace
of the size of the post and three feet long is inserted in the post
inclining forwards at an angle of sixty two degrees from a
horizontal line. This brace is made steady by a girt or an iron
rod with a screw and nut on one end and a head on the other
passing through it and the post near the top of the latter.
Beginning five feet nine inches from the bottom of the sills and th
a mortise is made thro' the post, in the same direction as
those below, an inch wide and eight inches long. A similar mor-
tise level with this is made thro' the brace. To the outside of the
brace below the mortise is fastened by screws a piece of cast iron shaped
thus  A & having a horizontal hole thro the projecting end. This
by means of two flat pieces of iron eight or ten inches long is
connected with the end of a lever which passes thro' the mortises
in the brace and post, and is about two feet nine inches long.
Back of the post several holes are made horizontally thro' this
lever and corresponding holes thro the lever first mentioned.
A rod with a clevis at each end connects the two levers,
the pins being passed thro' such of the holes as will give the
purchase and motion wanted. The end of a spring made
of hickory ash or other elastic timber is inserted in a mortise
near the top of the brace and passing over the top of the post is connected with the upper lever at the end by a leather strap having a
buckle by which it may be tightened or loosened at pleasure. An
important part of the machine, is a slide which is a rod of iron pol
ished round seven eighths of an inch in diameter and two feet seven inch-
es long. Into the lower end a hole is drilled longitudinally two inches
deep to serve as a socket for the chisel. About two inches from the
lower end in front a hole or mortise half an inch long and three six-
teenths wide is made thro' it by which the chisel may be keyed or
driven ^out. About two inches from the lower end on one side a small
hole is also drilled through it, and four and a half inches above anoth-
er, into which is inserted and fastened the bent ends of a square
wire or guide. Into the top of the slide a hole is also drilled two
inches deep into which a bolt is inserted and fastened by a pin. This
bolt has a head shaped like half a globe or ball the top being round
A ring with pins projecting at opposite sides called a yoke surrounds
the bolt between the head and the slide the pins going thro' the ends
of a clevis which passes over the upper lever near the post. To the lower
side of this lever is fastened an iron plate, into which a hole is coun-
tersunk to receive the head of the bolt, which is drawn up into it by
a wedge driven between the upper side of the lever and the clevis.
About two inches below this lever the slide passes thro' a box shaped
thus . The projection is inserted in a hole thro' the post. Against this
hole on the left side a mortise is made into the post and a small hole is bo
red to the mortise from the right side. A holdfast being a screw with
an eye on one end and a thumb nut on the other is introduced into the
mortise and hole; the projection of the box passing through the eye. By
means of this the slide may be set at any desired distance from the post.
The slide then passes down through a hole in the brace, and about two
inches above the lower end of the slide it passes thro' another box con-
structed thus. It consists of several parts and is made of cast iron.
One part is shaped thus  and the other thus . The length of the larger
piece from a to b, is about six inches, the general thickness three fourths
of an inch, a rib or projection rising at the edges, a and b. The part c

344 X9513 3-18-1836 is inserted in a hole thro' the post, and made fast in the same way as the
upper box before described. The smaller piece is the same thickness, a little
shorter and is connected with the larger by screws so that the two half cir-
cles form a hole or box an inch and a quarter in diameter. Within this
an inner box: the hole thro which is seven eighths of an inch in diameter
being the same as that of the slide. It has a perpendicular groove cut on one
side inside for the square wire or guide to run in. It is an inch and a half long
and has a groove encircling it on the outside as wide as the two first descri-
bed parts are thick, and so deep that the part thus made smaller may
be received into and turn within the outer box. At the upper end of this in-
ner box on one side, outside is a small projection one fourth of an inch
long, round half an inch in diameter with a hole made into it longitudi-
nally to receive one end of a small spring or latch. By this spring or
latch the slide may be turned half round and may be kept steady in place
by letting the latch fall into a small groove or notch made in the ribs or
projections above mentioned. The machine should be set up on the right
side of a stud or post and bolted to it. and if convenient a long spring
may be used fastened to a joist above instead of the short one attach
ed to the machine. When the machine is to be used the moveable
rest is adjusted and made fast at the proper place to admit the wood
to be mortised between the rest and the steel on the post. The wood to be
mortised is ~~to be~~ placed on the rest; the chisel is set to cut either head
of the mortise the lower lever is pressed down by the foot which brings down
the upper lever to which the slide is attached and drives the chisel
into the wood. The foot being raised the spring at the top withdraws
the chisel from the wood, which is then moved, and the foot applied as before
and so on until one head of the mortise is finished. By means of the spring or
latch, the slide is then turned half round, and the other head of the mor-
tise is finished by a similar operation. To cut a [illegible] mortise one end of the rest should
be raised or lowered by means of the segment of a circle or circular brace below it.
What I claim as my own invention and not previously known in the above described machine
[illegible] is the mode of attaching the slide to the upper lever and that lever to the machine. and also the
W.H. lower bar and the circular braces herein described William Lamson }
[illegible] } Witnesses George [illegible] (1820 words)